United States Patent [19]

Kawase et al.

[11] 4,298,698

[45] Nov. 3, 1981

[54] METHOD FOR MANUFACTURE OF ION-EXCHANGE GRAFT MEMBRANE

[75] Inventors: Kaoru Kawase, Nagoya; Kiyoshi Hayakawa, Gifu, both of Japan

[73] Assignees: Agency of Industrial Science & Technology; Ministry of International Trade & Industry, both of Tokyo, Japan

[21] Appl. No.: 89,402

[22] Filed: Oct. 30, 1979

[30] Foreign Application Priority Data

Nov. 6, 1978 [JP] Japan .................................. 53-137145

[51] Int. Cl.$^3$ ........................... B01J 47/12; C08F 2/54
[52] U.S. Cl. ..................... 521/27; 260/17 A; 525/59
[58] Field of Search ............... 521/27; 525/59; 260/17 A

[56] References Cited

U.S. PATENT DOCUMENTS

3,083,118  3/1963  Bridgeford ................. 260/17 A

FOREIGN PATENT DOCUMENTS

648898  9/1962  Canada ........................... 260/17 A
850446  8/1958  United Kingdom ............... 525/59

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A graft membrane capable of ion exchange, manufactured by preparing in advance a film wherein an alkali salt or alkaline earth salt of an $\alpha$-alkyl acrylate is dispersed in a hydrophilic polymer and subsequently exposing the film to an ionizing high-energy radiation or ultraviolet radiation, or preparing a film wherein a catalyst is dispersed in addition to the aforementioned alkali salt or alkaline earth salt in the hydrophilic polymer and subsequently heating the film.

9 Claims, No Drawings

METHOD FOR MANUFACTURE OF ION-EXCHANGE GRAFT MEMBRANE

BACKGROUND OF THE INVENTION

This invention relates to a method for the manufacture of an ion-exchange membrane by the graft polymerization of an alkali salt or alkaline earth salt of an α-alkyl acrylate onto a hydrophilic polymer.

It has heretofore been known in the art to manufacture a graft polymer membrane by graft polymerizing a monomer on a polymer film through the application of high-energy or ultraviolet radiation or through the use of a catalyst, either after the monomer has been or while it is being adsorbed on the polymer film.

Where the combination of the monomer and the polymer involved happens to be such that the monomer is incapable of adsorption on the polymer, the graft polymer cannot be obtained by this conventional method. For example, solid monomers such as the alkali salts of α-alkyl acrylates are hardly adsorbed by cellulosic and hydrophilic polymers or by polyolefins. None of the combinations of these monomers and polymers, therefore, are capable of producing graft polymers by the aforementioned conventional method of graft polymerization. There has also existed a practicable method for manufacturing a graft polymer by dissolving a solid monomer in an organic solvent such as, for example, methanol or benzene, then soaking a polyolefinic or cellulosic polymer in the resultant solution and causing the monomer to be graft polymerized onto the polymer by virtue of a ionizing high-energy or ultraviolet radiation or a catalyst. This method, however, entails extra treatments for the removal of the unaltered monomer and the solvent which have impregnated the graft polymer and for the disposal of the by-produced polymer and the residual solvent occurring in the reaction. Moreover, the film to be manufactured by this method is swelled and possessed of uneven surfaces. For the purpose of commercial application, therefore, this method proves to be disadvantageous.

The object of this invention is to provide a method for manufacturing an ion-exchange graft polymer by graft polymerizing an alkali salt or alkaline earth salt of an α-alkyl acrylate onto a hydrophilic polymer incapable of ion exchange and onto which said salt is not adsorbable, without use of an organic solvent.

SUMMARY OF THE INVENTION

This invention accomplishes the object described above by providing a method for the manufacture of an ion-exchange membrane possessed of high reactivity, which method comprises preparing in advance a film wherein an alkali salt or alkaline earth salt of an α-alkyl acrylate as a solid monomer is dispersed in a hydrophilic polymer such as a polyvinyl alcohol and subsequently exposing the film to ionizing high-energy radiation or ultraviolet radiation, or preparing a film wherein a catalyst is dispersed in addition to the aforementioned alkali salt or alkaline earth salt and subsequently heating the film, whereby the alkali salt or alkaline earth salt of the α-alkyl acrylate is graft polymerized with high efficiency onto the hydrophilic polymer.

DESCRIPTION OF THE PREFERRED EMBODIMENT

This invention aims to provide a method for the manufacture of an ion-exchange membrane comprised of a graft polymer membrane produced by graft polymerization of a solid monomer onto a hydrophilic polymer film by the application of ionizing high-energy or ultraviolet radiation or by use of a catalyst. The solid monomer thus used in the graft polymerization is one member selected from the group consisting of alkali salts and alkaline earth salts of α-alkyl acrylates which are represented by the following generic structural formula:

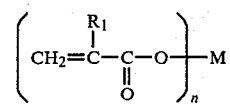

wherein n is an integer having the value of 1 or 2, $R_1$ is either a hydrogen atom or an alkyl group having 1 to 3 carbon atoms, and M is a potassium, sodium, calcium or barium atom. The compounds of this generic formula may be used either singly or in combination in the form of a mixture of two or more members. Examples of hydrophilic polymers which are advantageously used herein include partial acetification products and having an acetification degree of not more than 20% and completely saponified polymers of polyvinyl alcohols (the polymerization degree of the aforesaid two types of polymers being in the range of 500 to 2000), methyl cellulose (methylation degree in the range of 3 to 10%) and ethyl cellulose (ethylation degree in the range of 10 to 25%), which may be used in any desired form. The monomer and the polymer described above are mixed, the resultant mixture is converted into a film and the film is subjected to a treatment for the graft polymerization of the monomer to the polymer in the film. The formation of the film is started with dissolving the polymer in water. Although no special limitation is required to be set on the concentration of the polymer in the aqueous solution, the concentration selected in the range of from 1 to 30% by weight with a view to ensuring ease of handling generally promises good film-forming property of the resultant mixture. For the convenience of film-forming operation, the concentration of the solid monomer to be dissolved in the aforementioned polymer solution is desired to fall in the range of from 1 to 150% by weight based on the weight of the polymer present. In the case of the graft polymerization involving the use of a catalyst, the concentration of this catalyst so used is in the range of from 0.1 to 10% by weight based on the solid monomer such as the alkali salt or alkaline earth salt of the α-alkyl acrylate. Examples of catalysts which are advantageously used herein are radical initiators such as potassium persulfate, ammonium persulfate and cerium hydroxide. The aforementioned range is defined for the concentration of the catalyst because the polymer to be produced possesses a low molecular weight and exhibits inferior mechanical strength where the catalyst is used at a concentration exceeding the upper limit. The thickness of the film to be formed of the mixture depends on the concentration of the polymer present in the solution and the depth of the solution which exist at the time that the solution is cast in the molding die. Thus, the film of the mixture can be obtained to any desired thickness. The film-forming temperature is desired to fall in the range of from 25° to 40° C. The thickness of the membrane selected according to the particular kind of use to which the membrane is put. It is proper to say that this invention is characterized by the fact that the film can be manufactured in a freely regulated thickness and also the fact that the film obtained after the graft polymerization has the same uniform thickness as the film formed at first. When the film formed of the mixture of the monomer and the polymer is subjected to graft polymerization in accordance with this invention, the reaction is desired to be carried out at a temperature of not lower than 35° C. If the reaction temperature is below 34° C., the extent to which the graft polymerization proceeds is conspicuously low. The highest allowable reaction temperature is 120° C., a level at which neither the polymer nor the monomer undergoes thermal degradation. Ionizing high-energy radiation which are usable for this invention are gamma radiation, X-radiation and electron radiation. Gamma radiation from cobalt 60 is especially excellent. As the source for an ultraviolet radiation, it is desirable to use a high-pressure mercury vapor lamp or a low-pressure mercury vapor lamp. The desirable wavelength of the ultraviolet radiation falls in the range of from 230 to 400μ.

This invention economically provides a graft polymer membrane possessed of an outstanding capacity for ion exchange, which is produced by mixing the hydrophilic polymer and the alkali or alkaline earth salt of an α-alkyl acrylate, converting the mixture into a film and subjecting the film to a treatment with ionizing high-energy radiation or ultraviolet radiation or a catalyst and thereby causing the graft polymerization of the monomer onto the polymer. Use of this graft polymer membrane is not limited to applications which necessitate its capacity for ion exchange. Owing to its excellent permeability, it can find utility in various applications which necessitate use of dialysis, diaphragms, etc. To be specific, it finds practical utility in the recovery of silver from photographic waste solutions and the recovery of heavy metals from industrial effluents.

Now, the present invention will be described below specifically with reference to working examples.

EXAMPLE 1

In 75 g of water were dissolved 2.25 g of polyvinyl alcohol (2000 of polymerization degree and 0.0% of acetification degree) and 2.25 g of sodium methacrylate. The resultant solution was poured on a framed glass plate to a total area of 480 cm$^2$ (79.50 g in weight) and dried for 48 hours in a constant-temperature air bath kept at 33° C. to produce a film of polyvinyl alcohol and sodium methacrylate (1:1 mixture by weight) having a thickness of 0.048 mm.

A 0.0749-g portion of this film was placed in a test tube 20 mm in diameter and 20 cm in length. The test tube was connected to a high-vacuum system, freeze displaced with liquefied nitrogen twice, then evacuated to below $10^{-3}$ mmHg and thereafter sealed. The film as held in the test tube was placed under a cobalt-60 exposure system and exposed to the gamma radiation of an intensity of $6\times 10^{-4}$ roentgens/hour at 50° C. for 17 hours. After the exposure, the test tube was opened and the film was treated with 100 ml of methyl alcohol to remove the unaltered monomer. The treated film was dried in an air stream and dried under vacuum. The dried film was found to have lost 0.0177 g of weight (indicating a graft ratio of 52.7%). When a 0.0647-g portion of the same film was similarly sealed in a test tube, exposed to the gamma radiation at the same dosage at 50° C. for five hours and thereafter treated as described above, the resultant film was found to have lost 0.0247 g of weight (indicating a graft ratio of 23.6%).

EXAMPLE 2

By following the procedure of Example 1, a 0.1119-g portion of the film prepared in Example 1 was sealed in a quarts test tube. Under a high-pressure mercury vapor lamp (Model SHL-100 UV-2 made by Toshiba), the film as held in the test tube was placed in a constant-temperature water bath made of quartz and kept at 40° C. and then exposed to the light from the lamp at a dosage of 22.5 ergs/cm$^2$.min. for seven hours. After the exposure, the test tube was opened and the film was treated as in Example 1. The treated film was found to have lost 0.0189 g of weight (indicating a graft ratio of 33.8%). When a 0.2956-g portion of the same film was similarly sealed in the test tube, then exposed to the light from the lamp at a dosage of 31.0 ergs/cm$^2$.min. at 35° C. for two hours and therafter treated similarly to Example 1. The treated film was found to have lost 0.1270 g of weight (indicating a graft ratio of 14.1%).

EXAMPLE 3

In 75 g of water were dissolved 2.25 g of polyvinyl alcohol (1500 of polymerization degree and 0.0% of acetification degree), 2.25 g of sodium methacrylate and 0.05 g of potassium persulfate (2% based on the weight of the monomer). The resultant solution was poured onto a framed glass plate to a total area of 480 cm$^2$ (79.55 g in weight), then dried in a constant-temperature air bath kept at 30° C. for 48 hours. Consequently, there was obtained a film of polyvinyl alcohol and sodium methacrylate (1:1 mixture by weight) containing a polymerization catalyst and having a thickness of 0.049 mm. By following the procedure of Example 1, a 0.1042-g portion of the film was sealed in a test tube. The film as held in the test tube was heated by being immersed in a constant-temperature water bath kept at 60° C. for eight hours. After the heating, the film was removed from the test tube and treated in the same manner as in Example 1. The treated film was found to have lost 0.0414 g of weight (indicating a graft ratio of 20.5%).

EXAMPLE 4

In 75 g of water were dissolved 2.25 g of polyvinyl alcohol (2000 of polymerization degree and 0.0% of acetification degree) and 2.25 g of potassium methacrylate. The resultant solution was poured onto a framed glass plate to a total area of 480 cm$^2$ (79.50 g in weight) and dried in a constant-temperature air bath kept at 33° C. for 48 hours. Consequently, there was obtained a film of polyvinyl alcohol and potassium methacrylate (1:1 mixture by weight) having a thickness of 0.048 mm. A 0.0915-g portion of this film was sealed in a test tube in the same manner as in Example 1. The film as held in the test tube was exposed to a gamma radiation of an intensity of $6\times 10^4$ roentgens/hour at 50° C. for 22 hours. After the exposure, the film was treated by following the procedure of Example 1. The treated film was found to have lost 0.0228 g of weight (indicating a graft ratio of 50.1%).

EXAMPLE 5

By following the procedure of Example 2, a 0.0749-g portion of the film of Example 4 was sealed in a test tube. Under the same ultraviolet-radiation exposure system as used in Example 2, the film as held in the test tube was exposed to ultraviolet radiation at a dosage of 22.5 ergs/cm$^2$.min. at 50° C. for seven hours. After the exposure, the film was treated in the same manner as in Example 1. The treated film was found to have lost 0.0281 g of weight (indicating a graft ratio of 25.0%).

EXAMPLE 6

In 75 g of water were dissolved 2.25 g of polyvinyl alcohol (2000 of polymerization degree and 5.2% of acetification degree) and 2.25 g of potassium methacrylate. The resultant solution was poured onto a framed glass plate to a total area of 480 cm$^2$ (79.50 g in weight) and dried in a constant-temperature bath kept at 28° C. for 48 hours. Consequently, there was obtained a film of polyvinyl alcohol and potassium methacrylate (1:1 mixture by weight) having a thickness of 0.051 mm. A 0.0865-g portion of this film was sealed in a test tube in the same manner as in Example 1. The film as held in the test tube was exposed to radiation at the same dosage at 50° C. for five hours and then treated similarly. The treated film was found to have lost 0.0733 g of weight (indicating a graft ratio of 15.3%).

Test of polymer membranes obtained by this invention for ion-exchange capacity:

The graft membranes obtained as indicated in Examples 1, 2 and 4 above were immersed in a mixed solution consisting of formalin, sulfuric acid and sodium sulfate to convert the polyvinyl alcohol moiety thereof into acetal. They were subsequently immersed in an aqueous 5% sodium hydroxide solution to be converted to their original sodium salts, then washed with water and methanol, dried in an air stream, and again dried under vacuum and weighed. The graft membranes thus treated were immersed in an aqueous 1% nitric acid solution at 27° C. for ten minutes to undergo an ion-exchange reaction. Then, they were washed with water and methanol, dried in an air stream, again dried under vacuum and weighed to determine an increase in weight. The ion-exchange ratio which each graft membrane exhibited with respect to silver nitrate was as shown in Table 1. The ion-exchange ratio was determined in accordance with the actual weight of exchanged ions as calculated from the increase in weight and the theoretical weight of exchange ions as calculated from the graft ratio.

It is clear from the data of Table 1 that the ion-exchange reactions proceeded rapidly to high ion-exchange ratios.

TABLE 1

| Example No. | Agency of grafting | Graft ratio | Ion-exchange ratio |
|---|---|---|---|
| 1 | Gamma radiation | 52.7(%) | 88.7(%) |
| 2 | Ultraviolet radiation | 33.8 | 88.1 |
| 3 | Gamma radiation | 50.1 | 91.6 |

What is claimed is:

1. A method for the manufacture of an ion-exchange graft polymer membrane without the use of an organic solvent, which method comprises:

dissolving in water (a) a hydrophilic polymer selected form the group consisting of polyvinyl alcohol having a polymerization degree of 500 to 2000 and an acetification degree of 0% to 20%, methyl cellulose having a methylation degree of 3% to 10% and ethyl cellulose having an ethylation degree of 10% to 25%, and (b) at least one member selected from the group consisting of the alkali metal salts of α-alkyl acryl acids and alkaline earth metal salts of α-alkyl acryl acids;

pouring the resultant solution onto a substrate and drying the covered substrate such that a film of said hydrophilic polymer is formed in which at least one of said acryl salts is dispersed; and exposing said film to ionizing high energy radiation or ultraviolet radiation, thereby causing said at least one acryl salt to graft copolymerize onto said hydrophilic polymer within said film.

2. A method for the manufacture of an ion-exchange graft polymer membrane without the use of an organic solvent, which method comprises:

dissolving in water (a) a hydrophilic polymer selected from the group consisting of polyvinyl alcohol having a polymerization degree of 500 to 2000 and an acetification degree of 0% to 20%, methyl cellulose having a methylation degree of 3% to 10% and ethyl cellulose having an ethylation degree of 10% to 25%, (b) at least one member selected from the group consisting of the alkali metal salts of α-alkyl acryl acids and alkaline earth metal salts of α-alkyl acryl acids; and (c) a catalyst.

3. The method of claim 1 or 2, wherein said α-alkyl acryl salt has the formula:

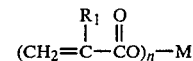

wherein $R_1$ is hydrogen or an alkyl group of 1 to 3 carbon atoms, M is K, Na, Ca or Ba and n is 1 or 2.

4. The method of claim 1 or 2, wherein the concentration of said hydrophilic polymer in the aqueous solution ranges from 1 to 30% by weight.

5. The method of claim 1 or 2, wherein the concentration of said α-alkyl acryl salt in said aqueous polymer containing solution ranges from 1% to 150% by weight based on the weight of polymer present.

6. The method of claim 2, wherein the concentration of said catalyst in said aqueous solution ranges from 0.1% to 10% by weight based on the solid monomer.

7. The method of claim 2, wherein said catalyst is potassium persulfate, ammonium persulfate or cerium hydroxide.

8. The method of claim 1 or 2, wherein said film is formed at a temperature of 25° to 45° C.

9. The method of claim 1 or 2, wherein said graft polymerization is conducted at a temperature of 35° to 170° C.

* * * * *